United States Patent
Hori et al.

(10) Patent No.: US 10,672,388 B2
(45) Date of Patent: Jun. 2, 2020

(54) METHOD AND APPARATUS FOR OPEN-VOCABULARY END-TO-END SPEECH RECOGNITION

(71) Applicant: Mitsubishi Electric Research Laboratories, Inc., Cambridge, MA (US)

(72) Inventors: Takaaki Hori, Lexington, MA (US); Shinji Watanabe, Baltimore, MD (US); John Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 46 days.

(21) Appl. No.: 15/843,055

(22) Filed: Dec. 15, 2017

(65) Prior Publication Data

US 2019/0189115 A1    Jun. 20, 2019

(51) Int. Cl.
*G10L 15/16* (2006.01)
*G10L 15/19* (2013.01)
(Continued)

(52) U.S. Cl.
CPC .............. *G10L 15/16* (2013.01); *G10L 15/02* (2013.01); *G10L 15/183* (2013.01);
(Continued)

(58) Field of Classification Search
CPC ....... G10L 15/02; G10L 15/16; G10L 15/183; G10L 15/32; G10L 2015/027; G10L 15/19
(Continued)

(56) References Cited

U.S. PATENT DOCUMENTS 6,070,136 A * 5/2000 Cong .................... G10L 15/32
                                                    704/222
8,589,162 B2 * 11/2013 Lejeune ................ G10L 15/08
                                                    704/251
(Continued)

FOREIGN PATENT DOCUMENTS

| CN | 106294460 A | 5/2015 |
| KR | 20170108693 A | 3/2017 |
| WO | 2017130089 A1 | 1/2017 |

OTHER PUBLICATIONS

Bahdanau, Dzmitry, et al. "End-to-end attention-based large vocabulary speech recognition." 2016 IEEE International Conference on Acoustics, Speech and Signal Processing (ICASSP). IEEE, Mar. 2016, pp. 4945-4949. (Year: 2016).*

(Continued)

*Primary Examiner* — James S Wozniak
(74) *Attorney, Agent, or Firm* — Gennadiy Vinokur; James McAleenan; Hironori Tsukamoto

(57) ABSTRACT

A speech recognition system includes an input device to receive voice sounds, one or more processors, and one or more storage devices storing parameters and program modules including instructions which cause the one or more processors to perform operations. The operations include extracting an acoustic feature sequence from audio waveform data converted from the voice sounds, encoding the acoustic feature sequence into a hidden vector sequence using an encoder network having encoder network parameters, predicting first output label sequence probabilities by feeding the hidden vector sequence to a decoder network having decoder network parameters, predicting second output level sequence probabilities by a hybrid network using character-base language models (LMs) and word-level LMs; and searching, using a label sequence search module, for an output label sequence having a highest sequence probability by combining the first and second output label sequence (Continued)

probabilities provided from the decoder network and the hybrid network.

17 Claims, 7 Drawing Sheets

(51) Int. Cl.
*G10L 15/183* (2013.01)
*G10L 15/02* (2006.01)
*G10L 15/187* (2013.01)
*G10L 15/22* (2006.01)

(52) U.S. Cl.
CPC ............ *G10L 15/187* (2013.01); *G10L 15/19* (2013.01); *G10L 15/22* (2013.01)

(58) Field of Classification Search
USPC .......................... 704/232, 235, 251, 254, 257
See application file for complete search history.

(56) References Cited

U.S. PATENT DOCUMENTS

| | | | |
|---|---|---|---|
| 9,047,268 | B2 | 6/2015 | Ouyang et al. |
| 9,792,900 | B1* | 10/2017 | Kaskari ................... G10L 15/20 |
| 9,830,318 | B2* | 11/2017 | Waibel .................... G06F 17/28 |
| 10,176,802 | B1* | 1/2019 | Ladhak ................... G10L 15/16 |
| 2005/0119885 | A1* | 6/2005 | Axelrod ................ G10L 15/063 704/231 |
| 2014/0214405 | A1* | 7/2014 | Ouyang ................. G06F 3/0237 704/9 |
| 2015/0228279 | A1* | 8/2015 | Biadsy .................... G10L 15/26 704/235 |
| 2015/0340034 | A1* | 11/2015 | Schalkwyk ............. G10L 15/18 704/235 |
| 2016/0232440 | A1* | 8/2016 | Gregor ................. G06N 3/0445 |
| 2017/0053652 | A1 | 2/2017 | Choi et al. |
| 2017/0140753 | A1* | 5/2017 | Jaitly ...................... G10L 15/26 |
| 2017/0148433 | A1* | 5/2017 | Catanzaro ............... G10L 15/02 |
| 2017/0192956 | A1* | 7/2017 | Kaiser ................... G06F 17/271 |
| 2017/0270919 | A1* | 9/2017 | Parthasarathi .......... G10L 15/20 |
| 2017/0372696 | A1* | 12/2017 | Lee ........................ G10L 15/02 |
| 2018/0011688 | A1* | 1/2018 | Wei ........................ G06F 3/167 |

OTHER PUBLICATIONS

Kanda, et a;. "Maximum-a-posteriori-based decoding for end-to-end acoustic models." IEEE/ACM Transactions on Audio, Speech, and Language Processing 25.5, May 2017, pp. 1023-1034. (Year: 2017).*

Shannon, Matt. "Optimizing expected word error rate via sampling for speech recognition." arXiv preprint arXiv:1706.02776, Jun. 2017, pp. 1-5. (Year: 2017).*

Zhang, Yu, et al. "Very deep convolutional networks for end-to-end speech recognition." 2017 IEEE International Conference on Acoustics, Speech and Signal Processing (ICASSP). IEEE, Mar. 2017, pp. 4845-4849. (Year: 2017).*

Kim, Yoon, et al. "Character-aware neural language models." Thirtieth AAAI Conference on Artificial Intelligence. Mar. 2016, pp. 2741-2749. (Year: 2016).*

Kozielski, Michał, et al. "Open vocabulary handwriting recognition using combined word-level and character-level language models." 2013 IEEE International Conference on Acoustics, Speech and Signal Processing. IEEE, May 2013, pp. 8257-8261. (Year: 2013).*

Lee, Minjae, et al. "FPGA-based low-power speech recognition with recurrent neural networks." 2016 IEEE International Workshop on Signal Processing Systems (SiPS). IEEE, Oct. 2016, pp. 230-235. (Year: 2016).*

Miao, Yajie, et al. "EESEN: End-to-end speech recognition using deep RNN models and WFST-based decoding." 2015 IEEE Workshop on Automatic Speech Recognition and Understanding (ASRU). IEEE, Dec. 2015, pp. 167-174. (Year: 2015).*

Wang, Bin, et al. "Joint-character-POC N-gram language modeling for Chinese speech recognition." The 9th International Symposium on Chinese Spoken Language Processing. IEEE, Oct. 2014, pp. 1-4. (Year: 2014).*

Hori et al., "Advances in Joint CTC Attention based End-to-End Speech Recognition with a Deep CNN Encoder and RNN LM," Zrxiv.org, Cornell University Library, Olin Library, Ithaca, NY, 14853. Jun. 8, 2017.

Watanabe et al., "Hybrid CTC Attention Architecture for End to End Speech Recognition," IEEE Journal of Selected Topics in Signal Processing, vol. 11, No. 8, Oct. 16, 2017. pp. 1240-1253.

Audhkhasi Karik et al., "End to End ASR Free Keyword Search from Speech," IEEE International Conference on Acoustics, Speech and Signal Processing, Mar. 5, 2017. pp. 4840-4844.

Suyoun Kim et al., "Joint CTC Attention based End to End Speech Recognition using Multi Task Learning," Arxiv.org, Cornell University Library, 201 Olin Library, Ithaca, NY. 14853. Sep. 22, 2016.

Messina et al., "Over Generative Finite State Transducer N Gram for Out of Vocabulary Word Recognition," 2014—11th IAPR International Workshop on Document Analysis Systems, IEEE, Apr. 7, 2014. pp. 212-216.

Yasumasa et al., "Gated Word Character Recurrent Language Model," Arxiv.org, Cornell University Library, 201 Olin Library, Ithaca NY 14853. Jun. 6, 2016.

Wang et al., "Handling OOVWords in Mandarin Spoken Term Detection with an Hierarchical N Gram Language Model." Chinese Journal of Electronics, Technology Exchange Ltd., Hong Kong, HK, vol. 26, No. 6. Nov. 1, 2017. pp. 1239-1244.

Klosowski Piotr, "Polish Language Modelling for Speech Recognition Application," 2017 Signal Processing: Algorithms, Architectures, Arrangements, and Applications, Division of Signal Processing and Electronic Systems, Poznan University of Technology, Sep. 20, 2017. pp. 313-318.

Peng et al., "A Hybrid word phoneme based approach for improved vocabulary independent search in spontaneous speech," 8th International Conference on Spoken Language Processing, ICSLP 2004. Oct. 4, 2004. pp. 293-296.

Yazgan et al., "Hybrid Language Models for out of Vocabulary Word Detection in Large Vocabulary Conversational Speech Recognition," Acoustics, Speech and Signal Processing, 2004, IEEE International Conference on Montreal, Quebec, Canada. May 17, 2004, Piscataway, NJm USA, IEEE. vol. 1. p. 745-748.

Hori et al., "Multi Level Language Modeling and Decoding for open Vocabulary end to end Speech Recognition," 2017 IEEE Automatic Speech Recognition and Understanding Workshop, IEEE, Dec. 16, 2017. pp. 287-293.

* cited by examiner

WSJ data sets used for evaluation

| | # utterances | Length (h) |
|---|---|---|
| Training (WSJ1 si284) | 37,416 | 80 |
| Validation (dev93) | 503 | 1.1 |
| Evaluation (eval92) | 333 | 0.7 |

FIG. 5A

Word Error Rate (WER) with different language models on WSJ

| Language models | LM train data | dev93 | eval92 |
|---|---|---|---|
| No LM | - | 17.3 | 13.4 |
| Character RNN-LM | si284 | 15.5 | 11.5 |
| Character RNN-LM | WSJ | 12.3 | 7.7 |
| Word RNN-LM | WSJ | 17.1 | 12.6 |
| Word+character RNN-LM | WSJ | 9.6 | 5.6 |

FIG. 5B

| Vocabulary size | OOV rate | WER |
|---|---|---|
| 20K | 1.98 | 8.1 |
| 40K | 0.57 | 8.1 |
| 65K | 0.18 | 7.4 |
| open | - | 5.6 |

FIG. 7

METHOD AND APPARATUS FOR OPEN-VOCABULARY END-TO-END SPEECH RECOGNITION

FIELD OF THE INVENTION

This invention generally relates to an apparatus and a method for open-vocabulary end-to-end speech recognition, and more specifically to a method and system for end-to-end automatic speech recognition based on character-level and word-level language models.

BACKGROUND OF THE INVENTION

Automatic speech recognition is currently a mature set of technologies that have been widely deployed, resulting in great success in interface applications such as voice search. However, it is not easy to build a speech recognition system that achieves high recognition accuracy. One problem is that it requires deep linguistic knowledge on the target language that the system accepts. For example, a set of phonemes, a vocabulary, and a pronunciation lexicon are indispensable for building such a system. The phoneme set needs to be carefully defined by linguists of the language. The pronunciation lexicon needs to be created manually by assigning one or more phoneme sequences to each word in the vocabulary including over 100 thousand words. Moreover, some languages do not explicitly have a word boundary and therefore we may need tokenization to create the vocabulary from a text corpus. Consequently, it is quite difficult for non-experts to develop speech recognition systems especially for minor languages. The other problem is that a speech recognition system is factorized into several modules including acoustic, lexicon, and language models, which are optimized separately. This architecture may result in local optima, although each model is trained to match the other models.

End-to-end speech recognition has the goal of simplifying the conventional architecture into a single neural network architecture within a deep learning framework. To address or solve these problems, various techniques have been discussed in some literature. State-of-the-art end-to-end speech recognition systems are designed to predict a character sequence for a given speech input, because predicting word sequences directly from speech without pronunciation lexicon is much more difficult than predicting character sequences. However, the character-based prediction generally under-performs relative to word-based prediction, because of the difficulty of modeling linguistic constraints across long sequences of characters. If we have much more speech data with the corresponding transcripts, we could train a better neural network that predicts word sequences. However, it is very costly to collect such transcribed speech data and train the network with the large data set. Therefore, it is not easy to incorporate word-level prediction in the end-to-end speech recognition to improve recognition accuracy.

SUMMARY OF THE INVENTION

Some embodiments of the present disclosure are based on recognition that it is possible to improve label sequence prediction by a combination of character-level and word-level language models (LMs) in an end-to-end automatic speech recognition (ASR) architecture, where a LM may be a recurrent neural network (RNN) including long short-term memory (LSTM) units.

A character-level LM is combined with an attention decoder network module and connectionist temporal classification (CTC) module for end-to-end ASR. The character-level LM improves recognition accuracy to rival state-of-the-art DNN/HMM-based ASR systems in some languages. Although a character-level architecture can provide a way of open vocabulary ASR, the character-level LMs generally under-perform relative to word-level LMs for languages such as English with a small alphabet, because of the difficulty of modeling linguistic constraints across long sequences of characters.

Some embodiments of the present invention provide a novel method for end-to-end ASR decoding with LMs at both the character and word levels. In the decoding process of the present invention, character sequence hypotheses are first scored with the character-level LM until a word boundary is encountered. Known words are then re-scored using the word-level LM, while the character-level LM provides scores for out-of-vocabulary words.

This approach exploits the benefits of both character and word level architectures, and enables high-accuracy open-vocabulary end-to-end ASR. The evaluation results will be discussed at the end of the disclosure with a standard Wall Street Journal (WSJ) task and show significant improvement by the open-vocabulary end-to-end ASR.

According to some embodiments of the present invention, a speech recognition system includes an input device to receive voice sounds; one or more processors; and one or more storage devices storing parameters and program modules including instructions executable by the one or more processors which, when executed, cause the one or more processors to perform operations that include extracting, using an acoustic feature extraction module, an acoustic feature sequence from audio waveform data converted from the voice sounds; encoding the acoustic feature sequence into a hidden vector sequence using an encoder network having encoder network parameters; predicting first output label sequence probabilities by feeding the hidden vector sequence to a decoder network having decoder network parameters; predicting second output level sequence probabilities by a hybrid network using character-level language models (LMs) and word-level LMs; and searching, using a label sequence search module, for an output label sequence having a highest sequence probability by combining the first and second output label sequence probabilities provided from the decoder network and the hybrid network.

According to another embodiment of the present invention, a non-transitory computer readable-recoding medium storing a program causing a computer, in communication with a memory, to execute speech recognition process, the speech recognition process includes providing voice sounds; extracting, using an acoustic feature extraction module, an acoustic feature sequence from audio waveform data converted from the voice sounds; encoding the acoustic feature sequence into a hidden vector sequence using an encoder network having encoder network parameters; predicting first output label sequence probabilities by feeding the hidden vector sequence to a decoder network having decoder network parameters; predicting second output level sequence probabilities by a hybrid network using character-level language models (LMs) and word-level LMs; and searching, using a label sequence search module, for an output label sequence having a highest sequence probability by combining the first and second output label sequence probabilities provided from the decoder network and the hybrid network.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5A is an evaluation result obtained by performing an open-vocabulary end-to-end speech recognition, according to embodiments of the present invention;

FIG. 5B shows word error rate (WER) with different language models, according to embodiments of the present invention;

FIG. 7 is an evaluation result indicating the comparison of WERs when using different vocabulary sizes from 20K to 65K and the open vocabulary condition.

Figure 1:
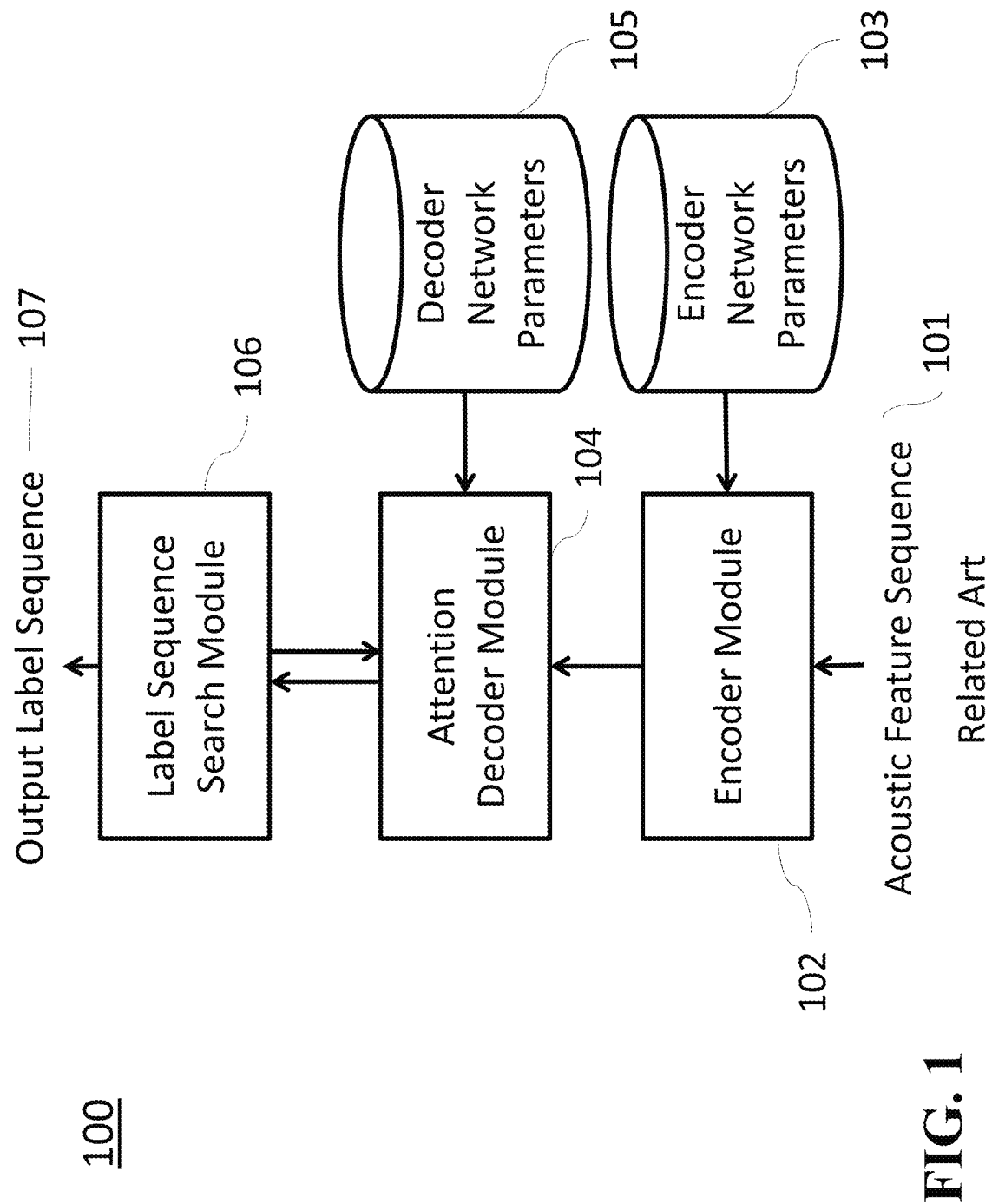
FIG. 1 is a block diagram illustrating an attention-based end-to-end speech recognition method according to a related art.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Modules and networks exemplified in the present disclosure may be computer programs, software or instruction codes, which can execute instructions using one or more processors. Modules and networks may be stored in one or more storage devices or otherwise stored into computer readable media such as storage media, computer storage media, or data storage devices (removable and/or non-removable) such as, for example, magnetic disks, optical disks, or tape, in which the computer readable media are accessible from the one or more processors to execute the instructions.

Computer storage media may include volatile and non-volatile, removable and non-removable media implemented in any method or technology for storage of information, such as computer readable instructions, data structures, program modules, or other data. Computer storage media may be RAM, ROM, EEPROM or flash memory, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both using one or more processors. Any such computer storage media may be part of the device or accessible or connectable thereto. Any application or module herein described may be implemented using computer readable/executable instructions that may be stored or otherwise held by such computer readable media.

FIG. 1 is a block diagram illustrating an attention-based end-to-end speech recognition module 100 according to a related art. In the attention-based end-to-end speech recognition module 100, an encoder module 102 first converts acoustic feature sequence 101 into a hidden vector sequence using an encoder network read from encoder network parameters 103. Next, an attention decoder module 104 receives the hidden vector sequence from the encoder network module 102 and a previous label from a label sequence search module 106, and computes a posterior probability distribution of the next label for the previous label using a decoder network read from decoder network parameters 105, where labels can be letters, syllables, words or any units that represent a target language, but letters are widely used. The label sequence search module 106 finds the label sequence with the highest sequence probability using posterior probability distributions given by the attention decoder module 104, where the posterior probability of label sequence is computed as a product of the posterior probabilities of labels in the sequence.

The attention-based end-to-end speech recognition system is usually designed to predict character sequences for given speech input, because the encoder network parameters 103 and the decoder network parameters 105 can be optimized with much smaller amount of data compared to the case that the system predicts word sequences. However, if sufficient training data are available, the character-based prediction generally under-performs relative to word-based prediction, because of the difficulty of modeling linguistic constraints across long sequences of characters. But, it is very costly to collect a large amount of speech data with corresponding manual transcriptions. Therefore, it is not easy to incorporate word-level prediction in the end-to-end speech recognition to improve recognition accuracy.

Moreover, there is another problem when performing word-level prediction, which is known as the out-of-vocabulary (OOV) problem. In general, there exist a lot of words, which are not included in the vocabulary of an ASR system, because all words do not appear in the training data, and new words are often created by humans. The OOV problem is that such OOV words in the speech signal cannot be recognized correctly by the ASR system.

Some embodiments of the invention are based on recognition that it is possible to improve the accuracy of label sequence hypotheses by combining the attention-based probability with the character-level LM probabilities and word-level LM probabilities. The character-level and word-level LMs can be trained with text-only data. Since text data can be collected more easily than transcribed speech data, the invention enables us to perform word-level prediction for end-to-end ASR, which improves speech recognition accuracy by training the word-level LM with sufficient text data. Furthermore, the invention also mitigates the OOV problem by combining the character-level and word-level LMs.

Figure 2:
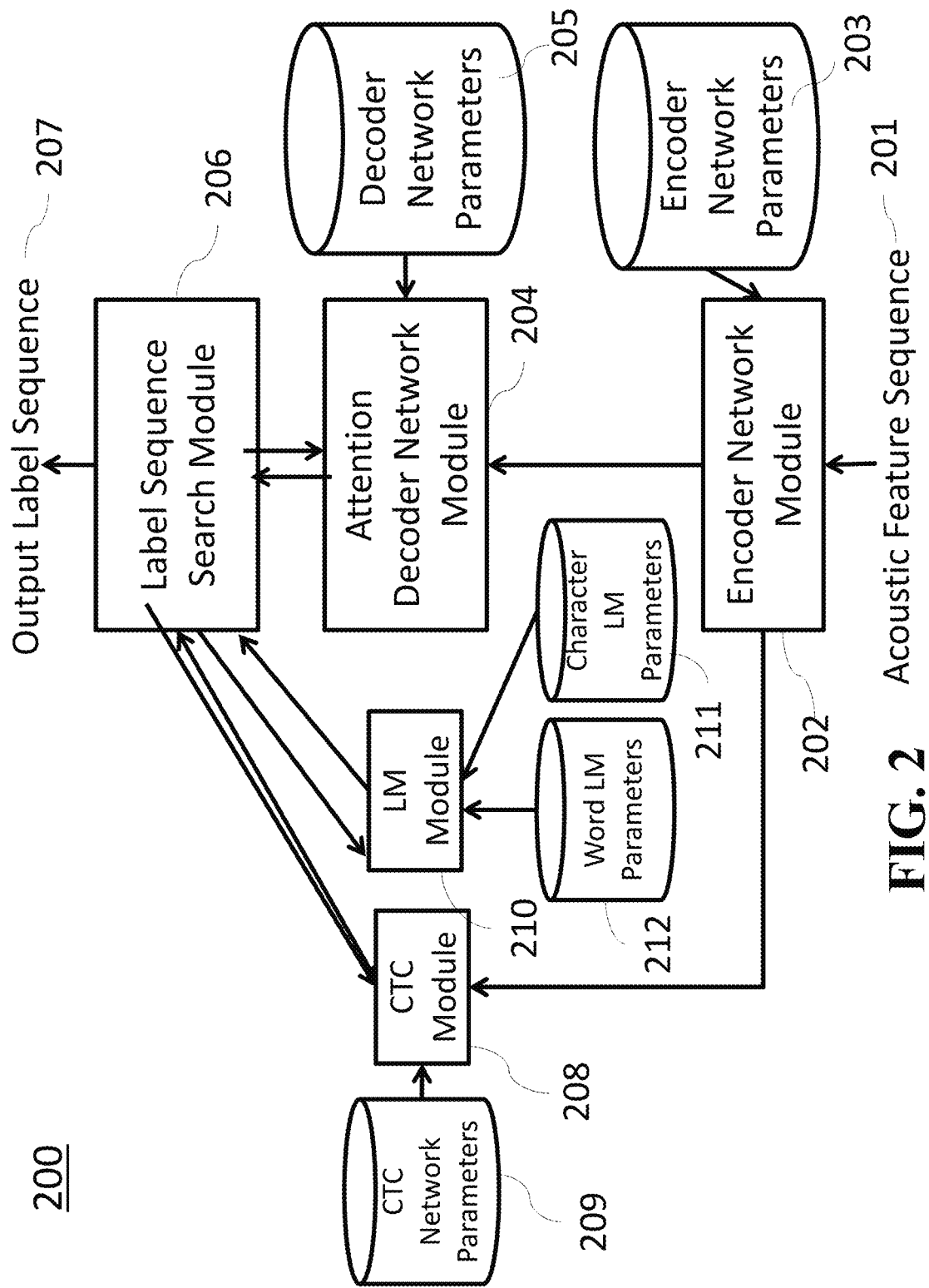
FIG. 2 is a block diagram illustrating an open-vocabulary end-to-end speech recognition module, according to embodiments of the present invention.

FIG. 2 is a block diagram illustrating an open-vocabulary end-to-end speech recognition module 200 according to embodiments of the present invention. The open-vocabulary end-to-end speech recognition module 200 includes an encoder network module 202, encoder network parameters 203, an attention decoder module 204, decoder network parameters 205, a label sequence search module 206, a CTC module 208, CTC network parameters 209 and an LM module 210, character LM parameters 211, and word LM parameters 212. The encoder network parameters 203, the decoder network parameters 205, the CTC network parameters 209, the LM parameters are respectively stored in a storage device to provide parameters to corresponding modules 202, 204, 208 and 210. An acoustic feature sequence 201 is extracted from audio waveform data or spectrum data using an acoustic feature extraction module 434 in FIG. 4. The audio waveform data or spectrum data may be stored in a storage device and provided to the encoder network module 202. The audio waveform data or spectrum data may be obtained via an input device 475 in FIG. 4 using a digital signal processing module (not shown) receiving and converting voice sounds into the audio waveform or spectrum data. Further, the audio waveform or spectrum data stored in a storage device 430 or memory 440 may be provided to the encoder network module 202. The signal of the voice sounds may be provided via a network 490 in FIG. 4, and the input device 475 may be a microphone device.

The encoder network module 202 includes an encoder network that converts acoustic feature sequence 201 into a hidden vector sequence using the encoder network reading parameters from the encoder network parameters 203.

An attention mechanism using an attention decoder network module 204 is described as follows. The attention decoder network module 204 includes a decoder network. The attention decoder network module 204 receives the hidden vector sequence from the encoder network module 202 and a previous label from the label sequence search module 206, and then computes first posterior probability distributions of the next label for the previous label using the decoder network reading parameters from the decoder network parameters 205. The attention decoder network module 204 provides the first posterior probability distribution to the label sequence search module 206. The CTC module 208 receives the hidden vector sequence from the encoder network module 202 and the previous label from the label sequence search module 206, and computes second posterior probability distributions of the next label sequence using the CTC network parameters 209 and a dynamic programming technique. After the computation, the CTC module 208 provides the second posterior probability distributions to the label sequence search module 206.

The LM module 210 receives the previous label from the label sequence search module 206, and computes third posterior probability distributions of the next label sequence using the LM parameters 211. Further, after the computation, the LM module 210 provides the third posterior probability distributions to the label sequence search module 206.

The label sequence search module 206 finds the label sequence with the highest sequence probability using the first, second and third posterior probability distributions provided from the attention decoder network module 204, the CTC module 208 and the LM module 210. The first, second and third posterior probabilities of label sequence computed by the attention decoder network module 204, the CTC module 208 and the LM module 210 are combined into one probability. In this case, the combination of the computed posterior probabilities may be performed based on the linear combination. With the open-vocabulary end-to-end speech recognition module 200, it becomes possible to take the CTC-based, attention-based and LM-based probabilities into account to find a better hypothesis to the input acoustic feature sequence.

According to embodiments of the present disclosure, it becomes possible to improve the recognition accuracy of end-to-end ASR by introducing the LM module 210. The LM module 210 may include a character-level recurrent neural network (RNN) and a word-level RNN. In some cases, the LM module 210 may be referred to as a hybrid network or a hybrid network module. In this case, the LM module 210 computes the LM probabilities using the character-level LM defined by character LM parameters 211 and the word-level LM defined by word LM parameters 212. The LM module also makes it possible to perform open-vocabulary speech recognition, i.e., even if OOV words are spoken, they are recognized by using the both character-level and word-level LMs. In the decoding process of the present invention, character sequence hypotheses are first scored with the character-level LM probabilities until a word boundary is encountered. Known words are then re-scored using the word-level LM probabilities, while the character-level LM provides LM probability scores for OOV words.

Attention-Based End-to-End Speech Recognition

End-to-end speech recognition is generally defined as a problem to find the most probable label sequence $\hat{Y}$ given input acoustic feature sequence X, i.e.

$$\hat{Y} = \operatorname*{argmax}_{Y \in \mathcal{U}^*} p(Y \mid X), \quad (1)$$

where $\mathcal{U}^*$ denotes a set of possible label sequences given a set of pre-defined labels $\mathcal{U}$. A label may be a character or a word.

In end-to-end speech recognition, p(Y|X) is computed by a pre-trained neural network without pronunciation lexicon and language model. In the attention-based end-to-end speech recognition of a related art, the neural network consists of an encoder network and a decoder network.

An encoder module 102 includes an encoder network used to convert acoustic feature sequence X=$x_1, \ldots, x_T$ into hidden vector sequence H=$h_1, \ldots, h_T$ as $$H = \text{Encoder}(X), \tag{2}$$

where function Encoder(X) may consist of one or more recurrent neural networks (RNNs), which are stacked. An RNN may be implemented as a Long Short-Term Memory (LSTM), which has an input gate, a forget gate, an output gate and a memory cell in each hidden unit. Another RNN may be a bidirectional RNN (BRNNs) or a bidirectional LSTM (BLSTM). A BLSTM is a pair of LSTM RNNs, one is a forward LSTM and the other is a backward LSTM. A Hidden vector of the BLSTM is obtained as a concatenation of hidden vectors of the forward and backward LSTMs.

With the forward LSTM, the forward t-th hidden vector $h_t^F$ is computed as $$h_t^F = o_t^F \odot \tan h(c_t^F) \tag{3}$$

$$o_t^F = \sigma(W_{xo}^F x_t + W_{xc}^F h_{t-1}^F + b_o^F) \tag{4}$$

$$c_t^F = f_t^F \odot c_{t-1}^F + i_t^F \odot \tan h(W_{xc}^F x_t + W_{hc}^F h_{t-1}^F + b_c^F) \tag{5}$$

$$f_t^F = \sigma(W_{xf}^F x_t + W_{hg}^F h_{t-1}^F + b_f^F) \tag{6}$$

$$i_t^F = \sigma(W_{xi}^F x_t + W_{hi}^F h_{t-1}^F + b_i^F). \tag{7}$$

where $\sigma(\cdot)$ is the element-wise sigmoid function, tan h($\cdot$) the element-wise hyperbolic tangent function, and $i_t^F$, $f_t^F$, $o_t^F$ and $c_t^F$ are the input gate, forget gate, output gate, and cell activation vectors for $x_t$, respectively. $\odot$ denotes the element-wise multiplication between vectors. The weight matrices $W_{zz}^F$ and the bias vector $b_z^F$ are the parameters of the LSTM, which are identified by the subscript z∈{x, h, i, f, o, c}. For example, $W_{hi}^F$ is the hidden-to-input gate matrix and $W_{xo}^F$ is the input-to-output gate matrix. The hidden vector $h_t^F$ is obtained recursively from the input vector $x_t$ and the previous hidden vector $h_{t-1}^F$, where $h_0^F$ is assumed to be a zero vector.

With the backward LSTM, the backward t-th hidden vector $h_t^B$ is computed as $$h_t^B = o_t^B \odot \tan h(c_t^B) \tag{8}$$

$$o_t^B = \sigma(W_{xo}^B x_t + W_{xc}^B h_{t-1}^B + b_o^B) \tag{9}$$

$$c_t^B = f_t^B \odot c_{t-1}^B + i_t^B \odot \tan h(W_{xc}^B x_t + W_{hc}^B h_{t-1}^B + b_c^B) \tag{10}$$

$$f_t^B = \sigma(W_{xf}^B x_t + W_{hg}^B h_{t-1}^B + b_f^B) \tag{11}$$

$$i_t^B = \sigma(W_{xi}^B x_t + W_{hi}^B h_{t-1}^B + b_i^B). \tag{12}$$

where $i_t^B$, $f_t^B$, $o_t^B$ and $c_t^B$ are the input gate, forget gate, output gate, and cell activation vectors for $x_t$, respectively. The weight matrices $W_{zz}^B$, and the bias vector $b_z^B$ are the parameters of the LSTM, which are identified by the subscript in the same manner as the forward LSTM. The hidden vector $h_t^B$ is obtained recursively from the input vector $x_t$ and the succeeding hidden vector $h_{t+1}^B$, where $h_{T+1}^B$ is assumed to be a zero vector.

The hidden vector of the BLSTM is obtained by concatenating the forward and backward hidden vectors as $$h_t = \left[ h_t^{F^T}, h_t^{B^T} \right]^T \tag{13}$$

where T denotes the transpose operation for the vectors assuming all the vectors are column vectors. $W_{zz}^F$, $b_z^F$, $W_{zz}^B$, and $b_z^B$ are considered the parameters of the BLSTM.

To obtain better hidden vectors, we may stack multiple BLSTMs by feeding the hidden vectors of the first BLSTM to the second BLSTM, then feeding the hidden vectors of the second BLSTM to the third BLSTM, and so on. If $h_t'$ is a hidden vector obtained by one BLSTM, we assume $x_t = h_t'$ when feeding it to another BLSTM. To reduce the computation, it may feed only every second hidden vectors of one BLSTM to another BLSTM. In this case, the length of output hidden vector sequence becomes the half of the length of input acoustic feature sequence.

All the parameters $W_{zz}^F$, $b_z^F$, $W_{zz}^B$, and $b_z^B$ identified by the subscript z∈{x, h, i, f, o, c} of the multiple BLSTMs are stored in the encoder network parameters 203, and used to compute hidden vector sequence H.

An attention decoder module 104 includes a decoder network used to compute label sequence probability $p_{att}$(Y|X) using hidden vector sequence H. Suppose Y is an L-length label sequence $y_1, y_2, \ldots, y_L$. To compute $p_{att}$(Y|X) efficiently, the probability can be factorized by a probabilistic chain rule as $$p_{att}(Y | X) = \prod_{l=1}^{L} p_{att}(y_l | y_1, \ldots, y_{l-1}, X), \tag{14}$$

and each label probability $p_{att}(y_l|y_1, \ldots y_{l-1}, X)$ is obtained from a probability distribution over labels, which is estimated using the decoder network as $$p_{att}(y|y_1, \ldots, y_{l-1}, X) = \text{Decoder}(r_l, q_{l-1}), \tag{15}$$

where y is a random variable representing a label, $r_l$ is called a content vector, which has content information of H. $q_{l-1}$ is a decoder state vector, which contains contextual information of the previous labels $y_1, \ldots, y_{l-1}$, and the previous content vectors $r_0, \ldots, r_{l-1}$. Accordingly, the label probability is obtained as the probability of $y = y_l$ given the context, i.e.

$$p_{att}(y_l|y_1, \ldots, y_{l-1}, X) = p_{att}(y = y_l|y_1, \ldots, y_{l-1}, X) \tag{16}$$

The content vector $r_l$ is usually given as a weighted sum of hidden vectors of the encoder network, i.e.

$$r_l = \sum_t a_{lt} h_t, \tag{17}$$

where $a_{lt}$ is called an attention weight that satisfies $\Sigma_t a_{lt} = 1$. The attention weights can be computed using $q_{l-1}$ and H as $$e_{lt} = w^T \tanh(W q_{l-1} + V h_t + U f_{lt} + b) \tag{18}$$

$$f_l = F * a_{l-1} \tag{19}$$

$$a_{lt} = \frac{\exp(e_{lt})}{\sum_{\tau=1}^{T} \exp(e_{l\tau})} \tag{20}$$

where W, V, F and U are matrices, and w and b are vectors, which are trainable parameters of the decoder network. $e_{lt}$ is a matching score between the (l−1)-th state vector $q_{l-1}$ and the t-th hidden vector $h_t$ to form a temporal alignment distribution $a_l=\{a_{lt}|t=1,\ldots,T\}$. $a_{l-1}$ represents the previous alignment distribution $\{a_{(l-1)t}|t=1,\ldots,T\}$ used for predicting the previous label $y_{l-1}$. $f_l=\{f_{lt}|t=1,\ldots,T\}$ is the convolution result with F for $a_{l-1}$, which is used to reflect the previous alignment to the current alignment. "*" denotes a convolution operation.

The label probability distribution is obtained with state vector $q_{l-1}$ and content vector $r_l$ as $$\text{Decoder}(r_l,q_{l-1})=\text{softmax}(W_{qy}q_{l-1}+W_{ry}r_l+b_y), \quad (21)$$

where $W_{qy}$ and $W_{ry}$ are matrices and $b_y$ is a vector, which are trainable parameters of the decoder network. The softmax( ) function is computed as $$\text{softmax}(v) = \left.\frac{\exp(v[i])}{\sum_{j=1}^{K}\exp(v[j])}\right|_{i=1,\ldots,K} \quad (22)$$

for a K-dimensional vector v, where v[i] indicates the i-th element of v.

After that, decoder state vector $q_{l-1}$ is updated to $l_{it}$ using an LSTM as $$q_l = o_l^D \odot \tan h(c_l^D) \quad (23)$$

$$o_l^D = \sigma(W_{xo}^D x_l + W_{xc}^D h_{l-1}^D + b_o^D) \quad (24)$$

$$c_l^D = f_l^D \odot c_{l-1}^D + i_l^D \odot \tan h(W_{xc}^D x_l + W_{hc}^D h_{l-1}^D + b_c^D) \quad (25)$$

$$f_l^D = \sigma(W_{xf}^D x_l + W_{hg}^D h_{l-1}^D + b_f^D) \quad (26)$$

$$i_l^D = \sigma(W_{xi}^D x_l + W_{hi}^D h_{l-1}^D + b_i^D). \quad (27)$$

where $i_l^D$, $f_l^D$, $o_l^D$ and $c_l^D$ are the input gate, forget gate, output gate, and cell activation vectors for input vector $x_l$, respectively. The weight matrices $W_{zz}^D$ and the bias vector $b_z^D$ are the parameters of the LSTM, which are identified by the subscript in the same manner as the forward LSTM. The state vector $q_l$ is obtained recursively from the input vector $x_l^D$ and the previous state vector $q_{l-1}$, where $q_0$ is computed assuming $q_{-1}=0$, $y_0=<sos>$, and $a_0=1/T$. For the decoder network, the input vector $x_l^D$ is given as a concatenated vector of label $y_l$ and content vector $r_l$, which can be obtained as $x_l^D=[\text{Embed}(y_l)^T, r_l^T]^T$, where $\text{Embed}(\cdot)$ denotes label embedding, that converts a label into a fixed dimensional vector. For example, it can be computed by $$\text{Embed}(y)=W_e^D\text{OneHot}(y), \quad (28)$$

where OneHot(y) denotes a 1-of-N coding of label y which converts a label index to a one hot vector representation. $W_e^D$ is a matrix, which is a trainable parameter.

All the parameters $W_{zz}^D$ and $b_z^D$ identified by the subscript $z\in\{x, h, i, f, o, c\}$ and $W_{qy}$, $W_{ry}$, $b_y$, $W_e^D$ are stored in the decoder network parameters 205, and used to compute the label probability distribution $p_{att}(y|y_1,\ldots,y_{l-1}, X)$ Label sequence search module 106 of a related art finds the most probable label sequence $\hat{Y}$ in Eq. (1). However, it is difficult to enumerate all possible label sequences for Y and compute $p_{att}(Y|X)$, because the number of possible label sequences increases exponentially to the length of the sequence. Therefore, a beam search technique is usually used to find $\hat{Y}$, in which shorter label sequence hypotheses are generated first, and only a limited number of hypotheses, which have a higher score than others, are extended to obtain longer hypotheses. Finally, the best label sequence hypothesis is selected in the complete hypotheses that reached the end of the sequence.

With the beam search method, label sequence search module 106 finds $\hat{Y}$ as follows. Let $\Omega_l$ be a set of partial hypotheses of the length l. At the beginning of the first-pass beam search, $\Omega_0$ contains only one hypothesis with the starting symbol <sos>. For l=1 to $L_{max}$, each partial hypothesis in $\Omega_{l-1}$ is expanded by appending possible single labels, and the new hypotheses are stored in $\Omega_l$, where $L_{max}$ is the maximum length of the hypotheses to be searched. The score of each new hypothesis is computed in the log domain as $$\Phi_{att}(h)=\Phi_{att}(g)+\log p_{att}(y|g,X), \quad (29)$$

where g is a partial hypothesis in $\Omega_{l-1}$, y is a single label appended to g, and h is the new hypothesis, i.e. $h=g\cdot y$. The probability $p_{att}(y|g)$ can be computed by Eq. (16), where we assume $\Phi_{att}(<sos>)=0$.

If y is a special label that represents the end of a sequence <eos>, h is added to $\hat{\Omega}$ but not $\Omega_l$, where $\hat{\Omega}$ denotes a set of complete hypotheses. Finally, $\hat{Y}$ is obtained as $$\hat{Y} = \underset{h\in\hat{\Omega}}{\arg\max}\,\Phi_{att}(h). \quad (30)$$

In the beam search process, $\Omega_l$ is allowed to hold only a limited number of hypotheses with higher scores, and the other hypotheses are pruned to improve the search efficiency.

A more concrete procedure is summarized as follows.

```
Input: X, L_max
Output: Ŷ
 1:     Ω_0 ← {<sos>}
 2:     Ω̂ ← ∅
 3:     Φ_att(<sos>) ← 0
 4:     for l = 1 ... L_max do
 5:         Ω_l ← ∅
 6:         while Ω_{l-1} ≠ ∅ do
 7:             g ← Head(Ω_{l-1})
 8:             Dequeue(Ω_{l-1})
 9:             for each y ∈ 𝒰 ∪ {<eos>} do
10:                 h ← g · y
11:                 Φ_att(h) ← Φ_att(g) + logp_att(y|g, X)
12:                 if y = <eos> then
13:                     Enqueue(Ω̂, h)
14:                 else
15:                     Enqueue(Ω_l, h)
16:                     if |Ω_l| > beamWidth then
17:                         h_min ← arg min_{h∈Ω_l} Φ_att(h)
18:                         Remove(Ω_l, h_min)
19:                     end if
20:                 end if
21:             end for
22:         end while
23:     end for
24:     Ŷ ← arg max_{h∈Ω̂} Φ_att(h)
```

In this procedure, $\Omega_l$ and $\hat{\Omega}$ are implemented as queues that accept partial hypotheses of the length l and complete hypotheses, respectively. In lines 1-2, $\Omega_0$ and $\hat{\Omega}$ are initialized as empty queues. In line 3, the score for the initial hypothesis <sos> is set to 0. In lines 4-23, each partial hypothesis g in $\Omega_{l-1}$ is extended by each label y in label set $\mathcal{U} \cup \{<eos>\}$, where operations Head($\Omega$) returns the first hypothesis in queue $\Omega$, and Dequeue($\Omega$) removes the first hypothesis from the queue.

Each extended hypothesis h is scored using the attention decoder network in line 11. After that, if y=<eos>, the hypothesis h is assumed to be complete and stored in $\hat{\Omega}$ in line 13, where Enqueue($\hat{\Omega}$, h) is an operation that adds h to $\hat{\Omega}$. If y≠<eos>, h is stored in $\Omega_l$ in line 15, where the number of hypotheses in $\Omega_l$, i.e. $|\Omega_l|$, is compared with a predetermined number beamWidth in line 16. If $|\Omega_l|$ exceeds beamWidth, the hypothesis with the minimum score $h_{min}$ in $\Omega_l$ is removed from $\Omega_l$ in lines 17-18, where Remove($\Omega_l$, $h_{min}$) is an operation that removes $h_{min}$ from $\Omega_l$. Finally, $\hat{Y}$ is selected as the best hypothesis in line 24.

Open Vocabulary End-to-End Speech Recognition

In a method for performing end-to-end speech recognition using the open vocabulary end-to-end speech recognition module 200 according to embodiments of the invention, LM-based label sequence probability $p_{lm}(Y)$ in Eq. (31) and CTC-based label sequence probability $p_{ctc}(Y|X)$ in Eq. (53) are combined with attention-based label sequence probability $p_{att}(Y|X)$ in Eq. (14) to obtain more accurate label sequence probabilities, where these probabilities may be combined by linear combination.

LM Probability with Multi-Level RNN-LMs

LM probability can be computed as $$p_{lm}(Y) = \prod_{l=1}^{L} p_{lm}(y_l | y_1, \ldots, y_{l-1}), \quad (31)$$

using an RNN-LM or multi-level RNN-LMs, according to the embodiments of the invention.

An LM module 210 includes a character-level RNN-LM and a word-level RNN-LM, and their parameters are read from word LM parameters 211 and character LM parameters 212, respectively.

An RNN-LM may be used to compute a probability distribution over labels, which is estimated using the RNN-LM as $$p_{lm}(y|y_1, \ldots, y_{l-1}) = \text{softmax}^L(W_{sy}^{LM} s_{l-1} + b_y^{LM}), \quad (32)$$

where $W_{sy}^{LM}$ is a matrix and $b_y^{LM}$ is a vector, which are trainable parameters of the RNN-LM. $s_{l-1}$ is the LM state vector, and can be updated to $s_l$ using an LSTM for the RNN-LM as $$s_l = o_l^{LM} \odot \tan h(c_l^{LM}) \quad (33)$$

$$o_l^{LM} = \sigma(W_{xo}^{LM} x_l + W_{xc}^{LM} h_{l-1}^{LM} + b_o^{LM}) \quad (34)$$

$$c_l^{LM} = f_l^{LM} \odot c_{l-1}^{LM} + i_l^{LM} \odot \tan h(W_{xc}^{LM} x_l + W_{hc}^{LM} h_{l-1}^{LM} + b_c^{LM}) \quad (35)$$

$$f_l^{LM} = \sigma(W_{xf}^{LM} x_l + W_{hg}^{LM} h_{l-1}^{LM} + b_f^{LM}) \quad (36)$$

$$i_l^{LM} = \sigma(W_{xi}^{LM} x_l + W_{hi}^{LM} h_{l-1}^{LM} + b_i^{LM}). \quad (37)$$

where $i_l^{LM}$, $f_l^{LM}$, $o_l^{LM}$ and $c_l^{LM}$ are the input gate, forget gate, output gate, and cell activation vectors for input vector $x_l^{LM}$, respectively. The weight matrices $W_{zz}^{LM}$ and the bias vector $b_z^{LM}$ are the parameters of the LSTM for the RNN-LM, which are identified by the subscript in the same manner as the forward LSTM. The state vector $s_l$ is obtained recursively from the input vector $x_l^{LM}$ and the previous state vector $s_{l-1}$, where $s_0$ is computed assuming $s_{-1}=0$ and $y_0=$<sos>. For the decoder network, the input vector $x_l^{LM}$ is given as a vector of label $y_l$, which can be obtained as $x_l^{LM} = \text{Embed}(y_l)$, where Embed($\cdot$) denotes label embedding, that converts a label into a fixed dimensional vector. Embed ($\cdot$) denotes label embedding, that converts a label into a fixed dimensional vector. For example, it can be computed by $$\text{Embed}(y) = W_e^{LM} \text{OneHot}(y), \quad (38)$$

where OneHot(y) denotes a 1-of-N coding of label y which converts a label index to a one hot vector representation. $W_e^{LM}$ is a matrix, which is a trainable parameter of the RNN-LM.

The label probability is obtained as the probability of $y=y_l$ given the context, i.e.

$$p_{lm}(y_l|y_1, \ldots, y_{l-1}) = p_{lm}(y=y_l|y_1, \ldots, y_{l-1}) \quad (39)$$

Unlike the label probability given by the attention decoder network module 204, the LM probability does not depend on acoustic feature sequence X.

In the following, we introduce a method to compute label probability $p_{lm}(y_l|y_1, \ldots, y_{l-1})$ by combining a character-level LM and a word-level LM for open-vocabulary end-to-end ASR.

Suppose there are two RNN-LMs, one is a character-level RNN-LM trained with a set of character sequences and the other is a word-level RNN-LM trained with a set of word sequences.

We denote a character probability computed by the character-level RNN-LM as $p_{clm}(y_l|y_1, \ldots, y_{l-1})$ on character sequence $y_1, \ldots, t_{l-1}, y_l$, and the word probability computed by the word-level RNN-LM as $p_{wlm}(w_m|w_1, \ldots, w_{m-1})$ on word sequence $w_1, \ldots, w_{m-1}, w_m$, respectively. The both probabilities can be computed in the same way as in Eqs. (32)-(39), but using different parameter sets.

We consider that the character-based end-to-end ASR systems can predict space characters between words as well as characters within the word. Note that the space character has an actual character code. With the space characters, it is possible to deterministically map any character sequence to a word sequence, e.g., character sequence a, <space>, c, a, t, <space>, e, a, t, s is mapped to a unique word sequence a, cat, eats where <space> formally represents the space character. Accordingly, only when the decoder hypothesizes a space character, it computes the probability of the last word using the word-level RNN-LM and simply accumulates it to the hypothesis score. No special treatment is necessary for different types of homonyms: words with the same spelling but different pronunciations are handled in a context-dependent way by the word language model, whereas words with the same pronunciation but different spellings are automatically handled as different word hypotheses in the beam search. Similarly, ambiguous word segmentations are automatically handled as different decoding hypotheses.

The mechanism according to an embodiment can be implemented by modifying the character-level LM probabilities as follows.

Let V be the vocabulary of the word-level RNN-LM and be including an abstract symbol of OOV word such as <UNK>. We compute the conditional label probabilities in Eq. (31) as $$p_{lm}(c|g) = \begin{cases} \frac{p_{wlm}(w_g|\psi_g)}{p_{clm}(w_g|\psi_g)} & \text{if } c \in S, w_g \in V \\ p_{wlm}(<UNK>|\psi_g)\tilde{\beta} & \text{if } c \in S, w_g \notin V \\ p_{clm}(c|g) & \text{otherwise} \end{cases} \quad (40)$$

where S denotes a set of labels that indicate the end of word, i.e., S={<space>, <eos>}, $w_g$ is the last word of the character sequence g, and $\psi_g$ is the word-level history, which is the word sequence corresponding to g excluding $w_g$. For the above example, g, $w_g$ and $\psi_g$ are set as g=a, <space>, c, a, t, <space>, e, a, t, s $w_g$=eats $\psi_g$=a, cat.

$\tilde{\beta}$ is a scaling factor used to adjust the probabilities for OOV words.

The first condition on the right-hand side of Eq. (40) is used when the character c indicates the end of the previous word. In this case, the word-level probability $p_{wlm}(w_g|\psi_g)$ is computed using the word-level RNN-LM. The denominator $p_{clm}(w_g|\psi_g)$ is the probability of $w_g$ obtained by the character-level RNN-LM and used to cancel the character-level LM probabilities accumulated for $w_g$. The probability can be computed as $$p_{clm}(w_g|\psi_g) = \prod_{i=1}^{|w_g|} p_{clm}(w_{g,i}|\tilde{\psi}_g, w_{g,1}, \ldots, w_{g,i-1}) \qquad (41)$$

where $|w_g|$ is the length of word $w_g$ in characters, $w_{g,i}$ indicates the i-th character of $w_g$ and $\tilde{\psi}_g$ is the character representation of $\psi_g$, e.g., if $\psi_g$=a, cat, then $\tilde{\psi}_g$=a, <space>, c, a, t, <space>.

Thus, the accumulated character-level LM probabilities on character sequence g are rescored by the corresponding word-level LM probabilities.

The second term, $p_{wlm}(<UNK>|\psi_g)$ acts as a weight on the character-level LM and ensures that the combined language model is normalized over character sequences both at word boundaries and in-between.

If $w_g$ is an OOV word as in the second condition, we assume that a word-level probability for the OOV word can be computed with the word and character-level RNN-LMs as $$p_{oov}(w_g|\psi_g) = p_{wlm}(<UNK>|\psi_g) p_{clm}(w_g|<UNK>, \psi_g). \qquad (42)$$

Since the character-level probability satisfies $$p_{clm}(w_g|<UNK>, \psi_g) \propto p_{clm}(w_g|\psi_g), \qquad (43)$$

we approximate it as $$p_{clm}(w_g|<UNK>, \psi_g) = \frac{p_{clm}(w_g|\psi_g)}{1 - \sum_{w \in V} p_{clm}(w|\psi_g)} \qquad (44)$$
$$= \beta(\psi_g) p_{clm}(w_g|\psi_g)$$
$$\approx \tilde{\beta} p_{clm}(w|\psi_g),$$

and obtain $$p_{oov}(w_g|\psi_g) = p_{wlm}(<UNK>|\psi_g) \tilde{\beta} p_{clm}(w_g|\psi_g). \qquad (45)$$

where we assume the scaling factor $\beta(\psi_g) = \tilde{\beta}$, and set it as a tunable parameter. In the second condition of Eq. (40), character-based probability $p_{clm}(w_g|\psi_g)$ is eliminated since it is already accumulated for the hypothesis. This term allows predicting OOV words as well as in-vocabulary words and enables open-vocabulary ASR.

The third case of Eq. (40) gives the character-level LM probabilities to the hypotheses within a word. Although the character-level LM probabilities are canceled at the end of every known word hypothesis and so are only used to score OOV words, they serve another important role in keeping the correct word hypotheses active in the beam search until the end of the word where the word-level LM probability is applied.

All the parameters $W_{zz}^{LM}$ and $b_z^{LM}$ identified by the subscript $z \in \{x, h, i, f, o, c\}$ and $W_{sy}^{LM}$, $b_y^{LM}$, $W_e^{LM}$ of character-level and word-level LMs are stored in the character LM parameters 211 and the word LM parameters 212, respectively.

The parameters are used to compute the label probability distribution $p_{lm}(y|y_1, \ldots, y_{l-1})$.

CTC Probability

The CTC module 208 computes a CTC forward probability of label sequence Y given hidden vector sequence H. Note that the CTC formulation uses L-length label sequence $Y=\{y_l \in \mathcal{U} | l=1, \ldots, L\}$ with a set of distinct labels $\mathcal{U}$. By introducing framewise label sequence with an additional "blank" label, $Z=\{z_t \in \mathcal{U} \cup \{b\} | t=1, \ldots, T\}$, where b represents a blank label. By using the probabilistic chain rule and conditional independence assumption, the posterior distribution p(Y|X) is factorized as follows:

$$p(Y|X) \approx \sum_Z p(Y|Z) p(Z|X) \approx \qquad (46)$$
$$\sum_Z p(Y|Z) \prod_t p(z_t|X) \approx \sum_Z \prod_t p(z_t|z_{t-1}, Y) p(z_t|X),$$

where $p(z_t|z_{t-1}|Y)$ is considered a label transition probability including blank labels. $p(z_t|X)$ is the framewise posterior distribution conditioned on the input sequence X, and modeled by using bidirectional long short-term memory (BLSTM):

$$p(z_t|X) = \text{softmax}(W_{hy}^{CTC} h_t + b_y^{CTC}), \qquad (47)$$

where $h_t$ is obtained with an encoder network. $W_{hy}^{CTC}$ is a matrix and $b_y^{CTC}$ is a vector, which are trainable parameters of CTC and stored in CTC network parameters 209. Although Eq. (46) has to deal with a summation over all possible Z, it is efficiently computed by using a forward algorithm.

The forward algorithm for CTC is performed as follows. We use an extended label sequence $Y'=y'_1, y'_2, \ldots, y'_{2L+1}=b, y_1, b, y_2, \ldots, b, y_L, b$ of length 2L+1, where a blank label "b" is inserted between each pair of adjacent labels. Let $\alpha_t(s)$ be a forward probability, which represents the posterior probability of label sequence $y_1, \ldots, y_l$ for time frames $1, \ldots, t$, where s indicates the position in the extended label sequence Y'.

For initialization, we set $$\alpha_1(1) = p(z_1 = b|X) \qquad (48)$$

$$\alpha_1(2) = p(z_1 = y_1|X) \qquad (49)$$

$$\alpha_1(s) = 0, \forall s > 2. \qquad (50)$$

For t=2 to T, $\alpha_t(s)$ is computed recursively as $$\alpha_t(s) = \begin{cases} \bar{\alpha}_t(s) p(z_t = y'_s|X) & \text{if } y'_s = b \text{ or } y'_{s-2} = y'_s \\ (\bar{\alpha}_t(s) + \alpha_{t-1}(s-2)) p(z_t = y'_s|X) & \text{otherwise} \end{cases}, \qquad (51)$$

where $$\bar{\alpha}_t(s) = \alpha_{t-1}(s) + \alpha_{t-1}(s-1). \qquad (52)$$

Finally, the CTC-based label sequence probability is obtained as $$p_{ctc}(Y|X) = \alpha_T(2L+1) + \alpha_T(2L). \qquad (53)$$

The framewise label sequence Z represents an alignment between input acoustic feature sequence X and output label sequence Y. When computing the forward probability, the recursion of Eq. (51) enforces Z to be monotonic and does not allow looping or big jumps of s in alignment Z, because the recursion to obtain $\alpha_t(s)$ only considers at most $\alpha_{t-1}(s)$, $\alpha_{t-1}(s-1)$, $\alpha_{t-1}(s-2)$. This means that when time frame proceeds one frame, the label changes from the previous label or blank, or keeps the same label. This constraint plays a role of the transition probability $p(z_t|z_{t-1}, Y)$ that enforces alignments to be monotonic. Hence, $p_{ctc}(Y|X)$ can be 0 or a very small value when it is computed based on irregular (non-monotonic) alignments.

Figure 3:
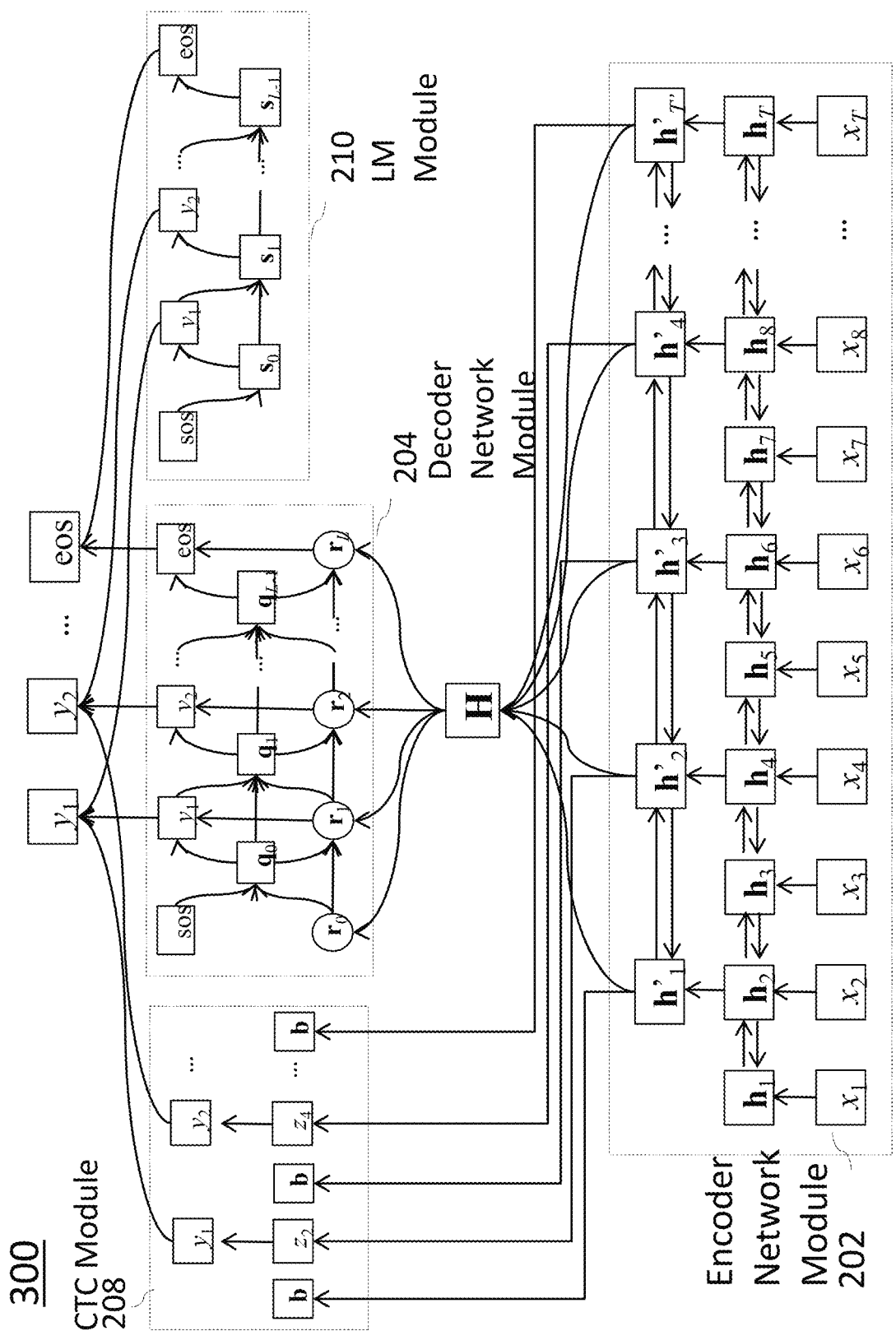
FIG. 3 is a schematic diagram illustrating neural networks in an open-vocabulary end-to-end speech recognition module, according to embodiments of the present invention.

FIG. 3 is a schematic diagram illustrating a combined neural network module 300 according to embodiments of the present invention. The combined neural network 300 includes an encoder network module 202, an attention decoder network module 204, a CTC module 208 and a LM module 210. Each arrow represents a data transfer with or without transformation, and each square or circle node represents a vector or a predicted label. Acoustic feature sequence $X=x_1, \ldots, x_T$ is fed to the encoder network module 202, where two BLSTMs are stacked and every second hidden vectors of the first BLSTM are fed to the second BLSTM. The output of the encoder module 202 results in hidden vector sequence $H=h'_1, h'_2, \ldots, h'_{T'}$ where $T'=T/2$. Then, H is fed to the CTC module 208 and the decoder network module 204. The CTC-based, attention-based and LM-based sequence probabilities are computed with the CTC module 208, the decoder network module 204, and the LM module 210, respectively, and combined to obtain the label sequence probability.

Label Sequence Search for Open-Vocabulary End-to-End ASR

Label sequence search module 206 finds the most probable label sequence $\hat{Y}$ according to the combined label sequence probabilities as $$\hat{Y} = \underset{Y \in \mathcal{U}^*}{\arg\max} \{\lambda \log p_{ctc}(Y|X) + (1-\lambda) \log p_{att}(Y|X) + \kappa \log p_{lm}(Y)\}, \quad (54)$$

where $p_{ctc}(Y|X)$ is the CTC-based label sequence probability in Eq. (53), $p_{att}(Y|X)$ is the attention-based label sequence probability in Eq. (14), and $p_{lm}(Y)$ is the LM-based label sequence probability in Eq. (31). $\lambda$ and $\kappa$ are scaling factors to balance these three probabilities.

In the beam search process of the present invention, the score of each partial hypothesis h is computed as $$\Phi_{joint}(h) = \lambda \Phi_{ctc}(h,X) + (1-\lambda) \Phi_{att}(h) + \kappa \Phi_{lm}(h), \quad (55)$$

where $\Phi_{att}(h)$ is computed by Eq. (29) and $\Phi_{lm}(h)$ is obtained as $$\Phi_{lm}(h) = \Phi_{lm}(g) + \log p_{lm}(y|g), \quad (56)$$

To compute $\Phi_{ctc}(h, X)$, we utilize the CTC prefix probability defined as the cumulative probability of all label sequences that have h as their prefix:

$$p_{ctc}(h, \ldots | X) \triangleq \sum_{v \in (\mathcal{U} \cup \{<eos>\})^+} p_{ctc}(h \cdot v | X), \quad (57)$$

and we define the CTC score as $$\Phi_{ctc}(h,X) \triangleq \log p_{ctc}(h, \ldots | X), \quad (58)$$

where v represents all possible label sequences except the empty string. The CTC score cannot be obtained recursively as $\Phi_{att}(h)$ in Eq. (29) and $\Phi_{lm}(h)$ in Eq. (56), but it can be computed efficiently by keeping the forward probabilities over the input time frames for each partial hypothesis.

According to the embodiments of the present invention, label sequence search module 206 finds $\hat{Y}$ according to the following procedure.

```
Input: X, L_max
Output: Ŷ
 1:    Ω_0 ← {<sos>}
 2:    Ω̂ ← ∅
 3:    Φ_att(<sos>) ← 0
 4:    Φ_lm(<sos>) ← 0
 5:    for l = 1 ... L_max do
 6:        Ω_l ← ∅
 7:        while Ω_{l-1} ≠ ∅ do
 8:            g ← Head(Ω_{l-1})
 9:            Dequeue(Ω_{l-1})
10:            for each y ∈ 𝒰 ∪ {<eos>} do
11:                h ← g · y
12:                Φ_att(h) ← Φ_att(g) + logp_att(y|g, X)
13:                Φ_lm(h) ← Φ_lm(g) + logp_lm(y|g)
14:                Φ_joint(h) ← λΦ_ctc(h, X) + (1 − λ)Φ_att(h) + κΦ_lm(h)
15:                if y = <eos> then
16:                    Enqueue(Ω̂, h)
17:                else
18:                    Enqueue(Ω_l, h)
19:                    if |Ω_l| > beamWidth then
20:                        h_min ← arg min_{h∈Ω_l} Φ_joint(h)
21:                        Remove(Ω_l, h_min)
22:                    end if
23:                end if
24:            end for
25:        end while
26:    end for
27:    Ŷ ← arg max_{h∈Ω̂}{Φ_joint(h) + κlogp_wlm(<eos>|ψ_h, w_h)}
```

There are some differences from the beam search method for the attention-based end-to-end ASR of a prior art.

In line 4, a LM score is initialized. In line 14, a joint score $\Phi_{joint}(h)$ is computed using CTC score $\Phi_{ctc}(h, X)$, attention-based score $\Phi_{att}(h)$, and LM score $\Phi_{lm}(h)$. In line 20, the joint score $\Phi_{joint}(h)$ is used to select $h_{min}$. In line 27, the joint score $\Phi_{joint}(h)$ and the word-level LM probability for <eos> are combined to decide $\hat{Y}$. Since the word-level LM probability for <eos> is not considered in Eq. (40), it needs to be combined in the final decision.

CTC score $\Phi_{ctc}(h, X)$ can be computed using a modified forward algorithm. Let $\gamma_t^{(n)}(h)$ and $\gamma_t^{(b)}(h)$ be the forward probabilities of the hypothesis h over the time frames 1 ... t, where the superscripts (n) and (b) denote different cases in which all CTC paths end with a nonblank or blank label, respectively. Before starting the beam search, $\gamma_t^{(n)}(\cdot)$ and $\gamma_t^{(b)}(\cdot)$ are initialized for $t=1, \ldots, T$ as $$\gamma_t^{(n)}(<sos>) = 0, \quad (59)$$

$$\gamma_t^{(b)}(<sos>) = \prod_{\tau=1}^{t} \gamma_{\tau-1}^{(b)}(<sos>) p(z_\tau = b | X), \quad (60)$$

where we assume that $\gamma_0^{(b)}(<sos>)=1$ and b is a blank label. Note that the time index t and input length T may differ from those of the input utterance X owing to the subsampling technique for the encoder. The CTC score function can be implemented as follows.

```
Input: h, X
Output: Φ_ctc (h, X)
 1:    g, y ← h ◁ split h into the last label y and the rest g
 2:    if y = <eos> then
 3:        return log{γ_T^(n)(g) + γ_T^(b)(g)}
```

```
4:     else
5:     
       γ₁⁽ⁿ⁾(h) ← { p(z₁ = y|X)   if g = <sos>
                   { 0              otherwise 6:     γ₁⁽ᵇ⁾(h) ← 0
7:     Ψ ← γ₁⁽ⁿ⁾(h)
8:     for t = 2 ... T do
9:     
       Γ ← γ_{t−1}⁽ᵇ⁾(g) + { 0              if last(g) = y
                            { γ_{t−1}⁽ⁿ⁾(g)  otherwise 10:    γ_t⁽ⁿ⁾(h) ← (γ_{t−1}⁽ⁿ⁾(h) + Γ)p(z_t = y|X)
11:    γ_t⁽ᵇ⁾(h) ← (γ_{t−1}⁽ᵇ⁾(h) + γ_{t−1}⁽ⁿ⁾(h))p(z_t = b|X)
12:    Ψ ← Ψ + Γp(z_t = y|X)
13:    end for
14:    return log(Ψ)
15:    end if
```

In this function, the given hypothesis h is first split into the last label y and the rest g in line 1. If y is <eos>, it returns the logarithm of the forward probability assuming that h is a complete hypothesis in line 3. The forward probability of h is given by $$p_{ctc}(h|X) = \gamma_T^{(n)}(g) + \gamma_T^{(b)}(g) \quad (61)$$

according to the definition of $\gamma_t^{(n)}(\cdot)$ and $\gamma_t^{(b)}(\cdot)$. If y is not <eos>, it computes the forward probabilities $\gamma_t^{(n)}(h)$ and $\gamma_t^{(b)}(h)$, and the prefix probability $\Psi = p_{ctc}(h, \ldots |X)$ assuming that h is not a complete hypothesis. The initialization and recursion steps for those probabilities are described in lines 5-13. In this function, it is assumed that whenever computing $\gamma_t^{(n)}(h)$, $\gamma_t^{(b)}(h)$ and $\Psi$ in lines 10-12, the probabilities $\gamma_{t-1}^{(n)}(g)$ and $\gamma_{t-1}^{(b)}(g)$ in line 9 have already been obtained through the beam search process because g is a prefix of h such that |g|<|h|. Accordingly, the prefix and forward probabilities can be computed efficiently. Note that last(g) in line 9 is a function that returns the last label of g.

Thus, the beam search method can exclude partial hypotheses with irregular alignments by the CTC score during the search process, and hopefully reduces the number of search errors with less computation compared to the rescoring method. The search error means that the most probable hypothesis is missed by the beam search. In this case, an alternative hypothesis with a less score is obtained instead of the best hypothesis, where the alternative hypothesis generally contains more recognition errors than the best one.

Network Training

Before using the ASR system, the network parameters 203, 205 and 209 are jointly optimized so that the loss function $$\mathcal{L}(X, Y, \Theta) = \sum_{n=1}^{N} -\lambda \log p_{ctc}(Y_n | X_n, \Theta) - (1 - \lambda) \log p_{att}(Y_n | X_n, \Theta), \quad (62)$$

is reduced, where X and Y are training data including acoustic feature sequences and label sequences. $\Theta$ denotes a set of network parameters. N is the number of training samples, $X_n$ and $Y_n$ are the n-th acoustic feature sequence and the corresponding label sequence in the training data, respectively. $p_{ctc}(Y_n|X_n,\Theta)$ is the CTC-based sequence probability in Eq. (53) computed with parameter set $\Theta$ and $p_{att}(Y_n|X_n,\Theta)$ is the attention-based sequence probability in Eq. (14) computed with parameter set $\Theta$. The network parameters may be optimized by a stochastic gradient descent method to reduce the loss function. The training procedure jointly optimizes the encoder, decoder, and CTC networks.

Character LM parameters 211 and word-level LM parameters 212 are independently optimized using character sequence data $Y^{(c)}$ and word sequence data $Y^{(w)}$.
The loss function for the character-level RNN-LM is $$\mathcal{L}(Y^{(c)}, \Theta_{clm}) = \sum_{n=1}^{N^{(c)}} -\log p_{clm}(Y_n^{(c)} | \Theta_{clm}), \quad (63)$$

and that for the word-level RNN-LM is $$\mathcal{L}(Y^{(w)}, \Theta_{wlm}) = \sum_{n=1}^{N^{(w)}} -\log p_{wlm}(Y_n^{(w)} | \Theta_{wlm}), \quad (64)$$

where $\Theta_{clm}$ and $\Theta_{wlm}$ denote sets of character LM parameters and word LM parameters, respectively. $p_{clm}(Y_n^{(c)}|\Theta_{clm})$ and $p_{wlm}(Y_n^{(w)}|\Theta_{wlm})$ are the LM probabilities computed as in Eq. (31). $N^{(c)}$ is the number of training samples in $Y^{(c)}$ and $Y_n^{(c)}$ is the n-th character sequence in $Y^{(c)}$. $N^{(w)}$ is the number of training samples in $Y^{(w)}$ and $Y_n^{(w)}$ is the n-th word sequence in $Y^{(w)}$.

The LM parameters may be optimized by a stochastic gradient descent method to reduce the loss function.

Open-Vocabulary End-to-End Speech Recognition Apparatus

Figure 4:
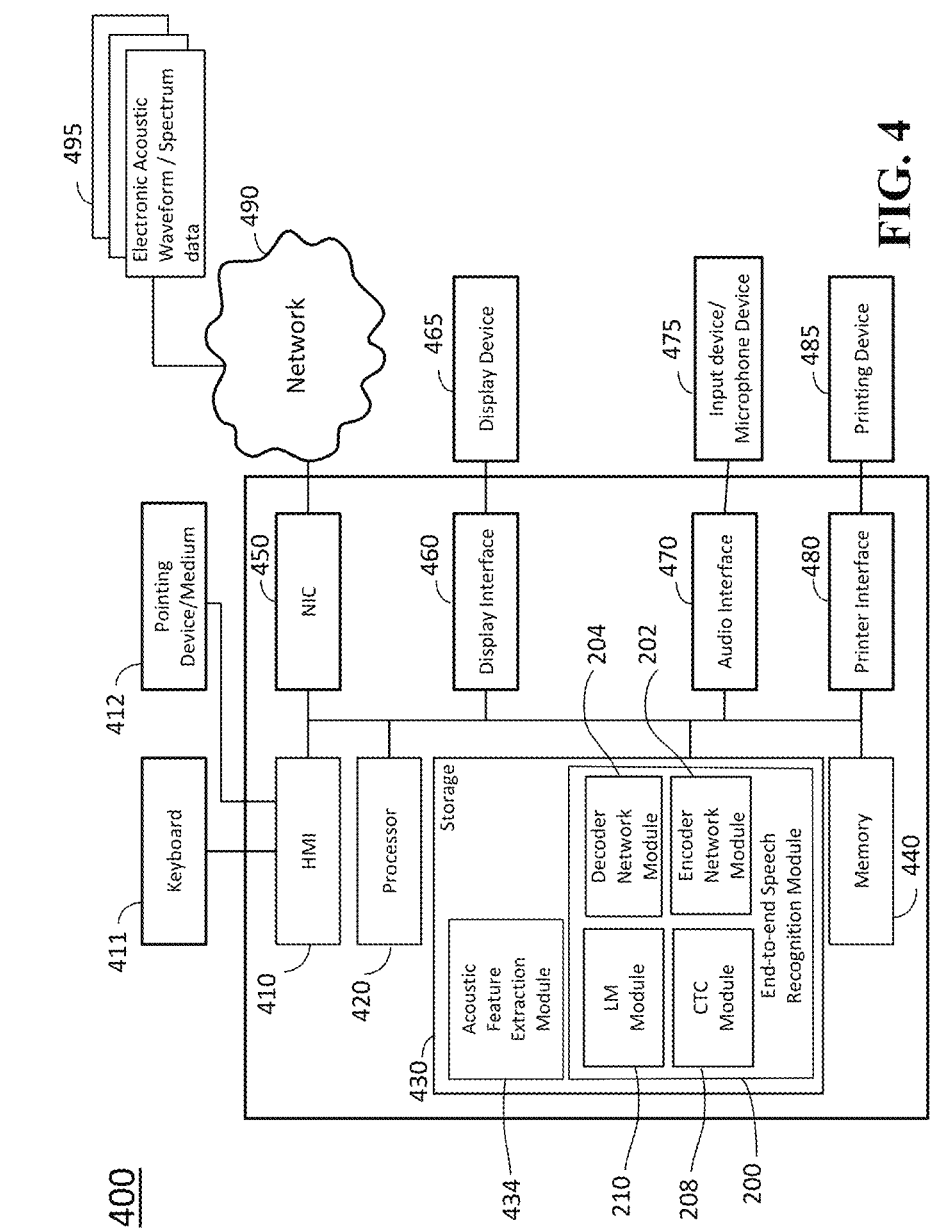
FIG. 4 is a block diagram illustrating an open-vocabulary end-to-end speech recognition system, according to embodiments of the present invention.

FIG. 4 shows a block diagram of an open-vocabulary end-to-end speech recognition system (speech recognition system) 400 according to some embodiments of the invention. The speech recognition system 400 includes a human machine interface (HMI) 410 connectable with a keyboard 411 and a pointing device/medium 412, one or more processor 420, a storage device 430, a memory 440, a network interface controller 450 (NIC) connectable with a network 490 including local area networks and internet network, a display interface 460, an audio interface 470 connectable with a microphone device 475, a printer interface 480 connectable with a printing device 485. The memory 440 may be one or more memory units. The end-to-end speech recognition system 400 can receive electric audio waveform/spectrum data 495 via the network 490 connected to the NIC 450. The storage device 430 includes an end-to-end speech recognition module 200, an attention decoder network module 204, an encoder network module 202, a CTC module 208, and an acoustic feature extraction module 434. A label sequence search module, encoder network parameters, decoder network parameters and CTC network parameters are omitted in the figure. The pointing device/medium 412 may include modules that read programs stored on a computer readable recording medium. The attention decoder network module 204, the encoder network module 202, and the CTC module 208 may be formed by neural network parameters. The acoustic feature extraction module 434 is a program used to extract an acoustic feature sequence from. The acoustic feature sequence may be a sequence of mel-scale filterbank coefficients with their first and second order temporal derivatives and/or pitch features.

For performing the end-to-end speech recognition, instructions may be transmitted to the end-to-end speech recognition system 400 using the keyboard 411, the pointing device/medium 412 or via the network 490 connected to other computers (not shown in the figure). The system 400 receives instructions via the HMI 410 and executes the instructions for performing end-to-end speech recognition using the processor 420 in connection with the memory 440 by loading the end-to-end speech recognition module 200, the attention decoder network module 204, the encoder network module 202, the CTC module 208, and the acoustic feature extraction module 434 stored in the storage device 430.

Evaluation Results

FIG. 5 is an evaluation result obtained by performing an open-vocabulary end-to-end speech recognition, according to embodiments of the present invention.

The evaluation was performed using the Wall Street Journal (WSJ) corpus, which is a well-known English clean speech database. We used the si284 data set for training, the dev93 data set for validation, and the eval92 data set for evaluation. The data sets are summarized in FIG. 5A

As input features, we used 80 mel-scale filterbank coefficients with pitch features and their delta and delta delta features for the BLSTM encoder, where we also added a convolutional neural network (CNN) layers before the BLSTM encoder. For the attention model, we used only 32 distinct labels: 26 English letters, apostrophe, period, dash, space, noise, and sos/eos tokens. The CTC model used the blank instead of sos/eos, and our MTL model used both sos/eos and the blank.

Further, the encoder network is boosted by using the CNN, which is motivated by prior studies. We used a 6-layer architecture based on the initial layers of the CNN architecture followed by eight BLSTM layers in the encoder network. In the CNN architecture, the initial three input channels are composed of the spectral features, delta, and delta delta features. Input speech feature images are downsampled to (¼×¼) images along with the time-frequency axes through the two max-pooling layers. The BLSTM layers had 320 cells in each layer and direction, and the linear projection layer with 320 units is followed by each BLSTM layer.

We used the location-based attention mechanism, where the 10 centered convolution filters of width 100 were used to extract the convolutional features. The decoder was a one-layer unidirectional LSTM with 300 cells.

The AdaDelta algorithm with gradient clipping was used for the optimization. We also applied a unigram label smoothing technique to avoid over-confidence predictions. In the hybrid attention/CTC architecture, we used the $\lambda=0.1$ for training and the $\lambda=0.2$ and the $\gamma=1.1$ for decoding. The beam width was set to 30 in decoding under all conditions. The hybrid attention/CTC-based ASR with multi-level LMs was implemented by using the Chainer deep learning toolkit.

Character-level and word-level RNN-LMs were trained with the WSJ text corpus, which consisted of 37M words from 1.6M sentences. The character-level LM had a single LSTM layer with 800 cells and a 32-dimensional softmax layer while the word-level LM had a single LSTM layer with 1000 cells and a 20000-dimensional softmax layer, which equals the vocabulary size of the LM. We used the stochastic gradient descent (SGD) to optimize the RNN-LMs. The first experiment evaluates the contributions of language models.

FIG. 5B shows word error rate (WER) with different language models, according to embodiments of the present invention. The character-level LM reduces the WER from 13.4% to 11.5% even when using the transcriptions of si284 speech data for LM training, whose size is only 1.8% of the WSJ text corpus. This means that the separate language model has some complementary effect on the prediction performance. The WER is reduced to 7.7% by using more data from the WSJ text corpus. Next, we incorporate a word-level RNN-LM without any character-level RNN-LMs, where only word-level RNN-LM probabilities were applied at every position of space or end-of-sentence character. In this case, the WER increased up to 12.6%. Finally, when using both character and word-level RNN-LMs according to the proposed method, we have obtained a big improvement reaching 5.6% WER.

To investigate the reason for the high WER when using only the word-level RNN-LM, we conducted additional experiments with different beam widths ranging from 5 to 40.

Figure 6:
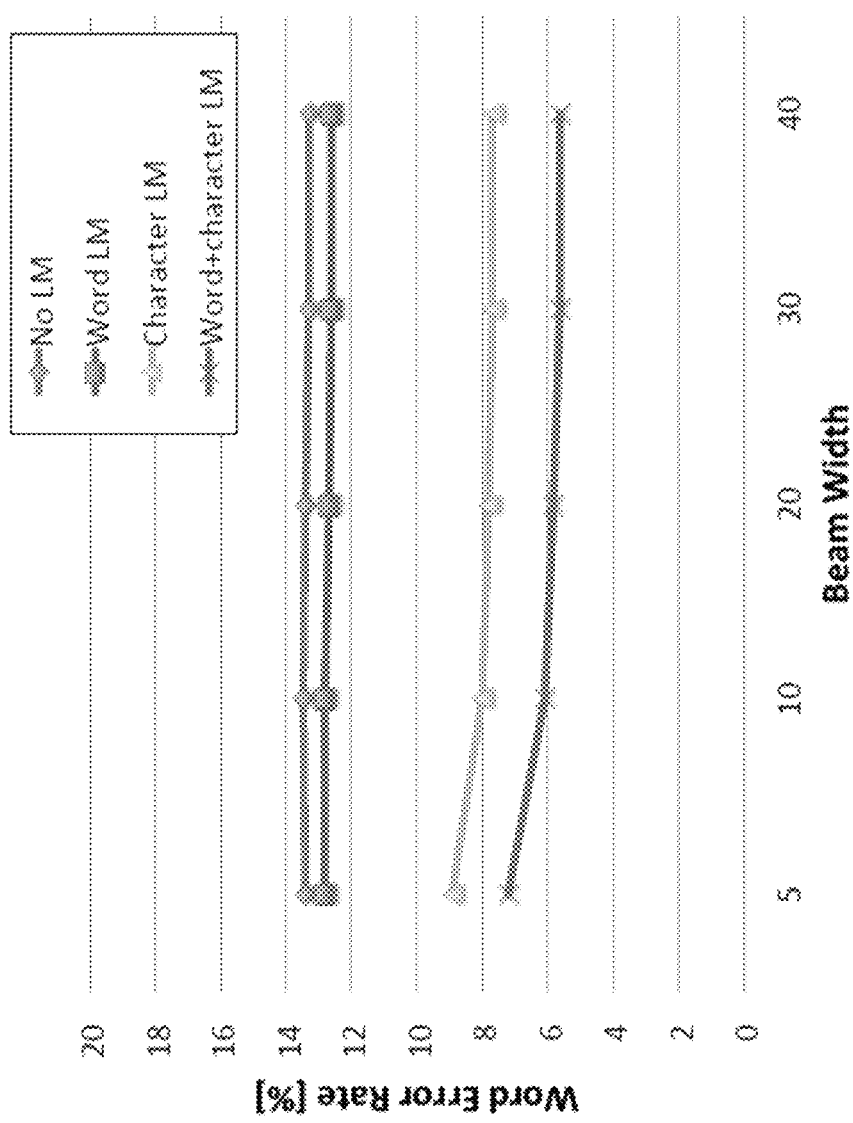
FIG. 6 is an evaluation result indicating word error rates as a function of beam widths, according to an open-vocabulary end-to-end speech recognition, according to embodiments of the present invention.

FIG. 6 is an evaluation result indicating word error rates as a function of beam widths, according to an open-vocabulary end-to-end speech recognition, according to embodiments of the present invention. FIG. 6 shows WERs for each beam width. Without character LM, i.e., No LM or Word LM, the WER is almost independent of the beam width. This means that the decoder network predicts labels with high confidence and does not change the result even with a wider beam. Consequently, applying the word-level LM probability at each word end is too late to recover better hypotheses using the word-level information. Our proposed method (word+character LM) achieves the lowest WER by combining the character-level LM as a guide for finding better word sequence hypotheses in beam search. Although the label smoothing technique we used for training the network mitigates this overconfidence problem to some extent, it seems difficult to recover the less-confident labels without any help of character-level LMs.

The second experiment investigates the benefit of the open vocabulary provided by the proposed method.

FIG. 7 is an evaluation result comparing WERs when using different vocabulary sizes from 20K to 65K and the open vocabulary condition. The comparison of WERs is performed with restricted vocabulary during decoding.

The vocabularies were just used to constrain all hypotheses to be consisted of only in-vocabulary words. This constraint can be forced by allowing only character sequences appearing in the vocabulary during decoding. As shown in the table, when using a closed vocabulary, the WER does not reach the best WER in the open vocabulary condition. Even with a small OOV rate by the 65K vocabulary, there is still a 1.8% gap to the best WER. We checked the recognition results, and found that they had more deletion errors. This seems to be because when the decoder cannot hypothesize label sequences with high probabilities due to the vocabulary constraint, the scores for the active hypotheses become smaller, and therefore shorter hypotheses tend to be selected as the result. In a standard Wall Street Journal (WSJ) task, we achieved 5.6% WER for the Eval'92 test set using only the SI284 training set and WSJ text data, which is the best.

In some embodiments of the present disclosure, when the end-to-end speech recognition system described above is installed in a computer system, speech recognition can be effectively and accurately performed with less computing power, thus the use of the end-to-end speech recognition method or system of the present disclosure can reduce central processing unit usage and power consumption.

Further, embodiments according to the present disclosure provide and effective method for performing end-to-end speech recognitions, thus, the use of a method and system using the end-to-end speech recognition model can reduce central processing unit (CPU) usage, power consumption and/or network band width usage.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Further, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A speech recognition system comprising:
one or more processors; and
one or more storage devices storing parameters and program modules including instructions executable by the one or more processors which, when executed, cause the one or more processors to perform operations comprising:
extracting an acoustic feature sequence from audio waveform data obtained via an audio interface or a network interface controller;
encoding the acoustic feature sequence into a hidden vector sequence using an encoder network having encoder network parameters;
predicting first output label sequence probabilities by feeding the hidden vector sequence to a decoder network having decoder network parameters;
predicting second output label sequence probabilities by a hybrid network using character-level language models (LMs) and word-level LMs, wherein when a character after a previous word belongs to a set of predetermined labels indicating an end of word and the previous word is included in vocabulary of the word-level LMs, the second output label sequence probabilities are computed from a division of probabilities obtained by using the word-level LMs and the character-level LMs, wherein when the character after the previous word belongs to the set of the predetermined labels and the previous word is not included in the vocabulary of the word-level LMs, the second output label sequence probabilities are computed by using the word-level LMs and a scaling factor, wherein when the character after the previous word does not belong to the set of the predetermined labels, the second output label sequence probabilities are computed by using the character-level LMs; and
searching for an output label sequence having a highest sequence probability by combining the first and second output label sequence probabilities provided from the decoder network and the hybrid network.

2. The speech recognition system of claim 1, wherein the operations further comprising:
predicting third output label sequence probabilities by a connectionist temporal classification (CTC) using CTC network parameters and the hidden vector sequence from the encoder network, wherein the searching is performed by combining the first, second and third output label sequence probabilities provided from the decoder network, the hybrid network and the CTC.

3. The speech recognition system of claim 2, wherein the CTC receives a previous label before predicting the third output label sequence probabilities.

4. The speech recognition system of claim 2, wherein the CTC computes posterior probability distributions using the CTC network parameters and a dynamic programming technique for predicting the third output label sequence probabilities.

5. The speech recognition system of claim 1, the hybrid network comprises a character-level recurrent neural network (RNN) computing character-level probabilities and a word-level RNN computing word-level probabilities.

6. The speech recognition system of claim 1, wherein the decoder network receives a previous label before predicting the first output label sequence probabilities.

7. The speech recognition system of claim 1, wherein the encoder network includes stacked Bidirectional Long Short-Term Memories (BLSTMs) and a convolutional neural network (CNN).

8. The speech recognition system of claim 1, wherein the decoder network includes stacked Long Short-Term Memories (LSTMs) and uses an attention mechanism for the hidden vector sequence to predict each of the first output label sequence probabilities.

9. The speech recognition system of claim 1, wherein a linear combination in logarithmic domain is used for combining the first and second output label sequence probabilities.

10. The speech recognition system of claim 1, wherein the searching uses a beam search to find the output label sequence with the highest sequence probability obtained by combining the first and second output label sequence probabilities provided from the decoder network and the hybrid network.

11. The speech recognition system of claim 10, wherein the beam search first finds a set of complete label sequence hypotheses using the first label sequence probabilities provided from the decoder network, and then finds, from among the set of complete label sequence hypotheses, the output label sequence with the highest sequence probability obtained by combining the first and second output label sequence probabilities provided from the decoder network and the hybrid network.

12. The speech recognition system of claim 10, wherein the beam search prunes incomplete label sequence hypotheses with a low sequence probability compared to other incomplete label sequence hypotheses, and the combined output label sequence probabilities are obtained by combining the first and second output label sequence probabilities provided from the decoder network and the hybrid network.

13. A non-transitory computer readable-recoding medium storing a program causing a computer, in communication with a memory, to execute speech recognition process, the speech recognition process comprising:
   providing voice sounds;
   extracting an acoustic feature sequence from audio waveform data converted from the voice sounds;
   encoding the acoustic feature sequence into a hidden vector sequence using an encoder network having encoder network parameters;
   predicting first output label sequence probabilities by feeding the hidden vector sequence to a decoder network having decoder network parameters;
   predicting second output label sequence probabilities by a hybrid network using character-level language models (LMs) and word-level LMs, wherein when a character after a previous word belongs to a set of predetermined labels indicating an end of word and the previous word is included in vocabulary of the word-level LMs, the second output label sequence probabilities are computed from a division of probabilities obtained by using the word-level LMs and the character-level LMs, wherein when the character after the previous word belongs to the set of the predetermined labels and the previous word is not included in the vocabulary of the word-level LMs, the second second output label sequence probabilities are computed by using the word-level LMs and a scaling factor, wherein when the character after the previous word does not belong to the set of the predetermined labels, the second output label sequence probabilities are computed by using the character-level LMs; and
   searching for an output label sequence having a highest sequence probability by combining the first and second output label sequence probabilities provided from the decoder network and the hybrid network.

14. The medium of claim 13, wherein the speech recognition process further comprising:
   predicting third output label sequence probabilities by a connectionist temporal classification (CTC) using CTC network parameters and the hidden vector sequence from the encoder network, wherein the searching is performed by combining the first, second and third output label sequence probabilities provided from the decoder network, the hybrid network and the CTC.

15. The medium of claim 14, wherein the CTC receives a previous label before predicting the third output label sequence probabilities.

16. The medium of claim 13, wherein the hybrid network comprises a character-level recurrent neural network (RNN) computing character-level probabilities and a word-level RNN computing word-level probabilities.

17. The medium of claim 13, wherein the decoder network receives a previous label before predicting the first output label sequence probabilities.

* * * * *